(12) United States Patent
Uenaka

(10) Patent No.: US 7,400,356 B2
(45) Date of Patent: Jul. 15, 2008

(54) LIGHTING CONTROL APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 762 days.

(21) Appl. No.: 11/016,726

(22) Filed: Dec. 21, 2004

(65) Prior Publication Data

US 2005/0134724 A1 Jun. 23, 2005

(30) Foreign Application Priority Data

Dec. 22, 2003 (JP) ............................ P2003-424378

(51) Int. Cl.
*H04N 5/222* (2006.01)
(52) U.S. Cl. ...................... 348/370; 348/371
(58) Field of Classification Search .............. 348/226.1, 348/227.1, 228.1, 229.1, 370, 371, 372; 396/9, 396/11, 97, 276; 315/241 P
See application file for complete search history.

(56) References Cited

U.S. PATENT DOCUMENTS 5,851,488 A * 12/1998 Saul et al. ...................... 422/67
6,304,767 B1 * 10/2001 Soller et al. .................. 600/322
2002/0008694 A1   1/2002 Miyachi et al.

FOREIGN PATENT DOCUMENTS

JP         10-186059         7/1998
JP         2002-72166        3/2002
JP         2003-101836       4/2003

OTHER PUBLICATIONS

M. Okamura, "Revised Operational Amplifier Circuit Design", CQ Publishing Co., Ltd., together with an English language translation of the same.
H. Tsunoda, "Operational Amplifier Circuit and Analysis through Experimentation", Tokyo Denki University Press, together with an English language translation of the same.
U.S. Appl. No. 11/016,906 to Uenaka et al., which was filed on Dec. 21, 2004.
U.S. Appl. No. 11/016,974 to Uenaka, which was filed on Dec. 21, 2004.

* cited by examiner

*Primary Examiner*—David Ometz
*Assistant Examiner*—Akshay Trehan
(74) *Attorney, Agent, or Firm*—Greenblum & Bernstein, P.L.C.

(57) ABSTRACT

A lighting control apparatus of a photographing apparatus, comprises a lighting device, a continuous imaging control processor, and a signal supplying processor. The lighting device illuminates a photographic subject by receiving one of a rectangular wave signal and a sine wave signal. The continuous imaging control processor performs a continuous imaging operation where a plurality of images of the photographic subject are continuously imaged. The signal supplying processor supplies the rectangular wave signal to the lighting device in the exposure time, and supplies the sine wave signal to the lighting device in the post-exposure time which is the time between the exposure time termination and the next exposure time start.

12 Claims, 12 Drawing Sheets

LIGHTING CONTROL APPARATUS

BACKGROUND OF THE INVENTION

1. Field of the Invention

The present invention relates to a lighting control apparatus for a photographing apparatus, and in particular to improvement of the lighting action in the continuous shot or video mode.

2. Description of the Related Art

A lighting device which uses LEDs is proposed, in place of a lighting device which uses strobe radiation such as a xenon pipe which has been widely used with photographing apparatus, such as a camera. LEDs can be driven at a low voltage, and the circuit construction of the LED is simple.

However, the temperature of an LED goes up due to continuous radiation of the LED. The rise of the LED temperature causes a decrease in the quantity of light emitted by the LED. FIG. 1 shows the relation between the temperature rise and the quantity of light emitted by the LED, so that FIG. 1 shows that the quantity of light, in other words, brightness of the LED falls when the temperature of the LED rises.

Japanese unexamined patent publication (KOKAI) No. 2003-101836 discloses a lighting device for a photographing apparatus. The radiating of light from the LEDs is driven by rectangular wave signals (pulse signals), and a continuous shot operation can be carried out while the LEDs radiate light.

Because a turn-off period is provided in the pulse signal, the LED radiation caused by this pulse signal is not continuous, hence the temperature rise of the LED due to the heat that occurs with continuous radiation is reduced in comparison to the temperature produced by the LED radiation when the direct current signal is used to drive the LED.

FIG. 2 shows a graph where the horizontal axis represents time and the vertical axis represents temperature. The graph shows the difference in temperature rise of the LED due to the direct current signal ((1) in FIG. 2) and the temperature rise of the LED due to the pulse signal (the rectangular wave signal) ((2) in FIG. 2).

When the pulse signal and the direct current signal are in the on state, the LED for lighting is illuminated.

In the case of the direct current signal, because a constant current flows during the period for which the LED should be illuminated (T0~T5), the temperature of the LED continues to go up. When the direct current signal changes to the off state (T5), the temperature of the LED descends.

In the case of the pulse signal, the period for which the LED is not illuminated is the period which the signal is in the off state (T1~T2, T3~T4), so that the temperature of the LED descends in this period (T1~T2, T3~T4). Accordingly, during the illumination period of the LED, the temperature of the LED repeatedly rises and descends. As a result, the accumulation of heat is small in comparison with in the case where the direct current signal is used.

However, the above-discussed Japanese unexamined patent publication does not disclose whether the LED radiates in the period between the exposure time termination and the next exposure time start, in other words the post-exposure time, in the continuous shot mode.

When the radiation of the LED is continued in the post-exposure time similar to the exposure time period, the composition of an image of the photographing apparatus can be confirmed in a frame period, in the continuous shot mode. However, when the rectangular wave signals are used, noise occurs in the power lines due to the rectangular wave signal switching between the on state and off state. Noise occurs in the peripheral circuit due to the high-frequency component which is included in the rectangular wave signal, and a rush current results.

When the radiation of the LED is stopped during the post-exposure time, the occurrence of noise can be reduced. However, the composition of an image of the photographing apparatus can not be confirmed in a frame period, in the continuous shot mode, so that it is difficult to shoot a moving photographic subject.

SUMMARY OF THE INVENTION

Therefore, an object of the present invention is to provide an apparatus which drives the lighting device by using a signal wave which has the high-frequency component removed in the rectangular wave signal, in order to reduce the influences of various kinds of noise, and for which the composition of an image can be confirmed, in a continuous shot mode or a video mode.

According to the present invention, a lighting control apparatus of a photographing apparatus, comprises a lighting device, a continuous imaging control processor, and a signal supplying processor.

The lighting device illuminates a photographic subject by receiving one of a rectangular wave signal and a sine wave signal.

The continuous imaging control processor performs a continuous imaging operation where a plurality of images of the photographic subject are continuously imaged.

The signal supplying processor supplies the rectangular wave signal to the lighting device in the exposure time, and supplies the sine wave signal to the lighting device in the post-exposure time which is the time between the exposure time termination and the next exposure time start.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
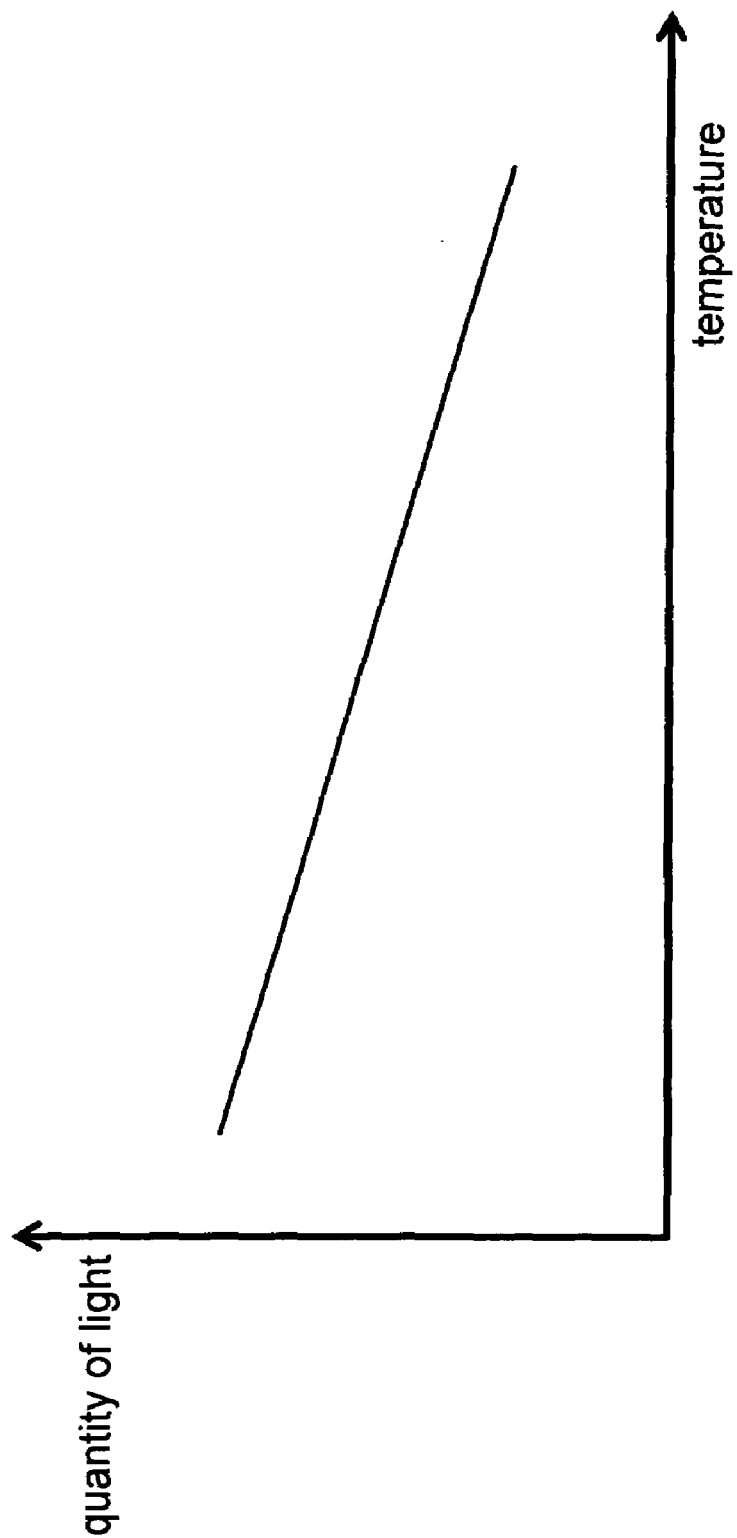
FIG. 1 shows a graph of the relationship between temperature of the LED and the quantity of light output by the LED.
Figure 2:
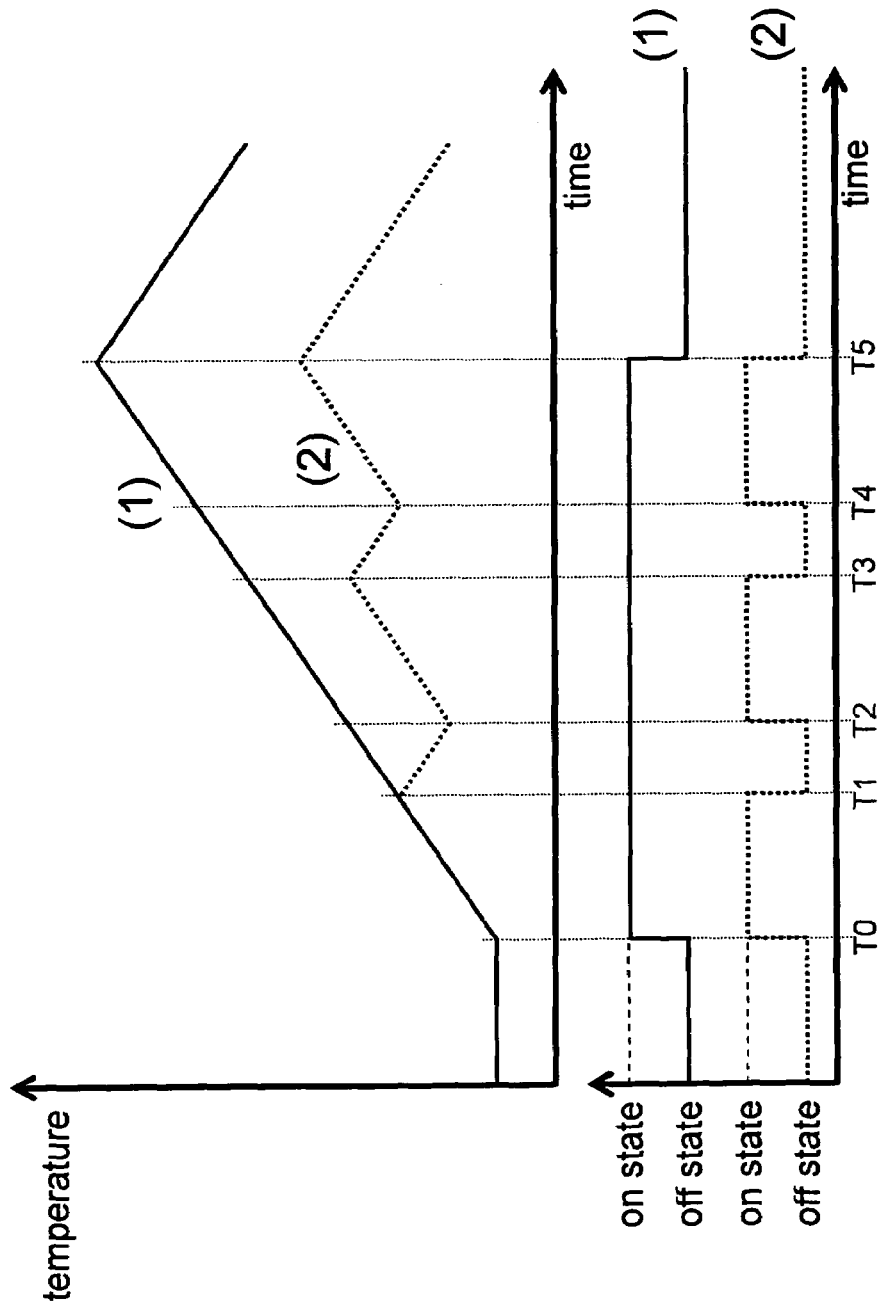
FIG. 2 shows a graph of the temperature change in the LED over time for the direct current signal and for the pulse signal.
Figure 3:
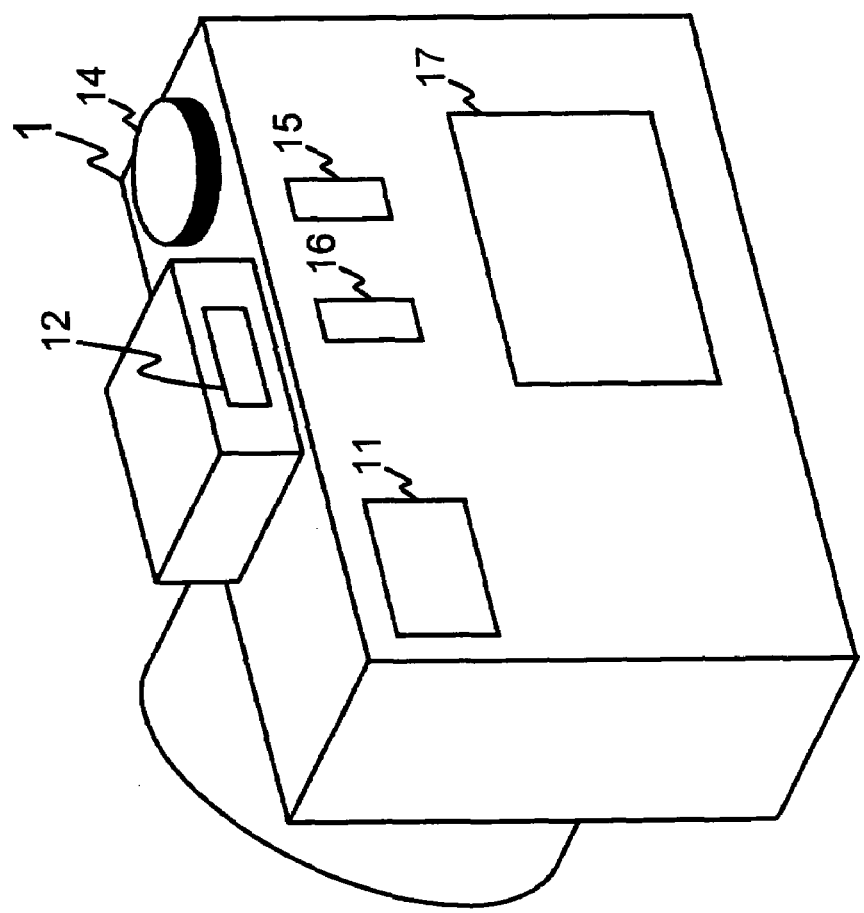
FIG. 3 is a perspective view of a photographing apparatus viewed from the back side of the photographing apparatus.
Figure 4:
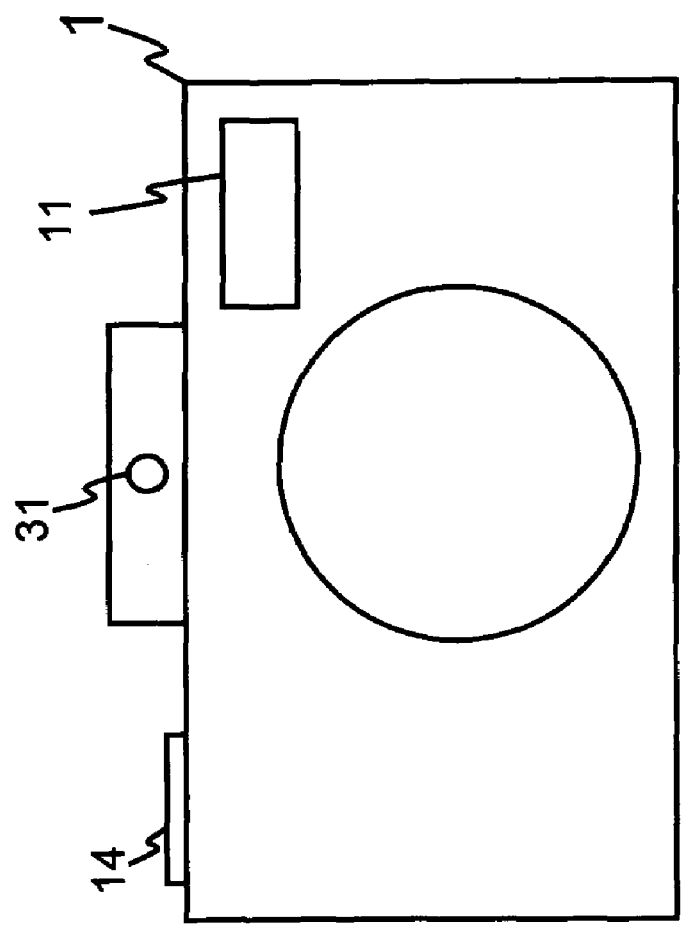
FIG. 4 is a front view of the photographing apparatus.
Figure 5:
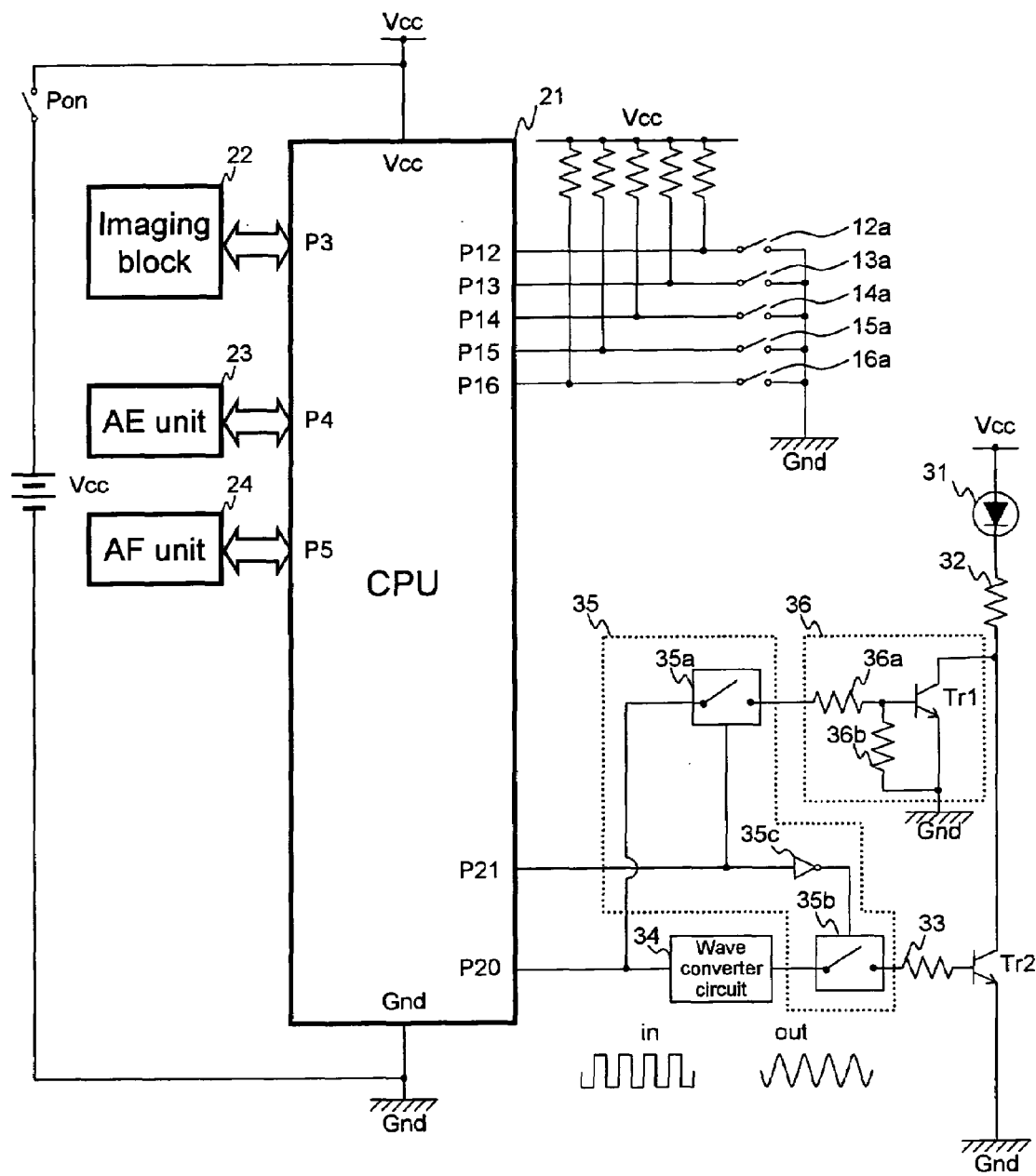
FIG. 5 is a circuit construction diagram of the photographing apparatus.
Figure 6:
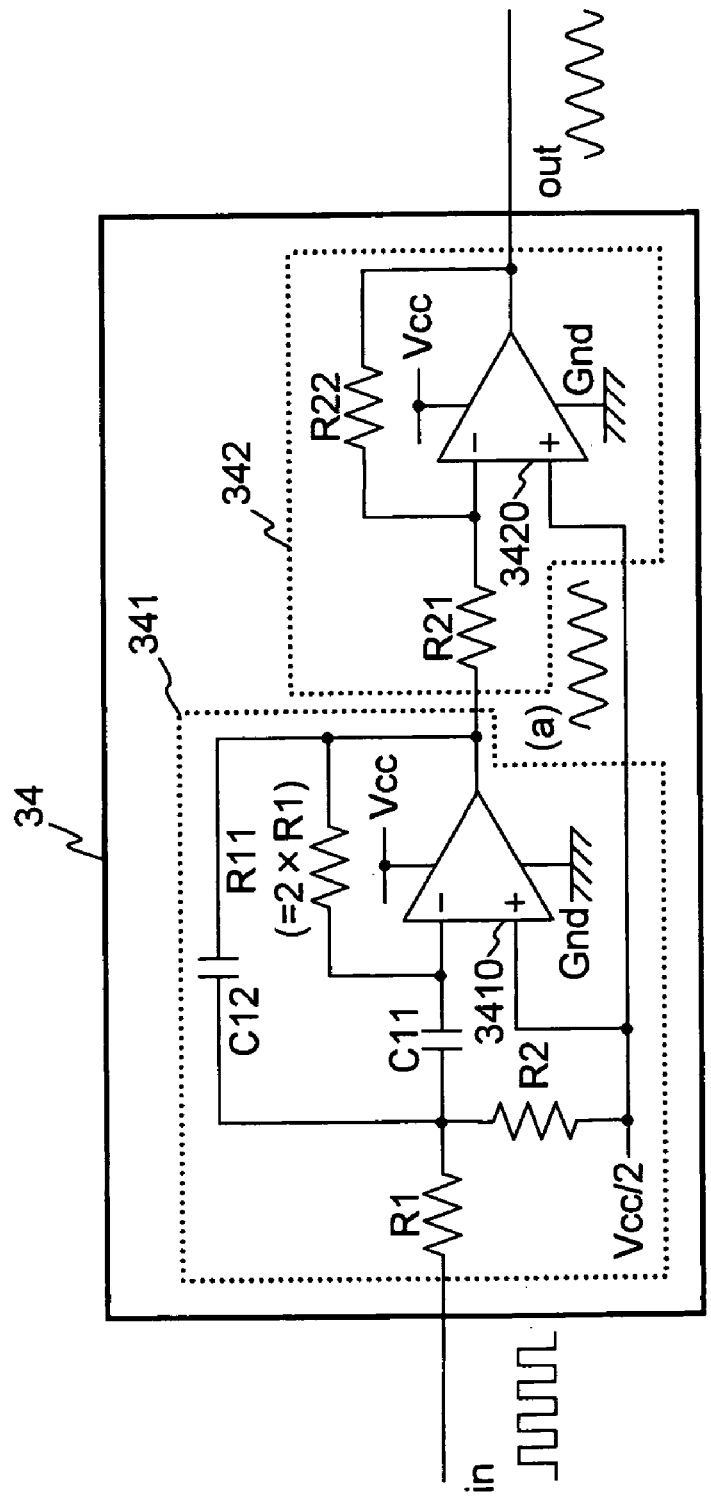
FIG. 6 is a circuit construction diagram of the wave converter circuit.

The present invention is described below with reference to this embodiment shown in the drawings. FIG. 3 shows a perspective view of a photographing apparatus 1 which comprises a lighting control unit, viewed from the back of the photographing apparatus 1. FIG. 4 is a front view of the photographing apparatus 1. In this embodiment, the photographing apparatus 1 is a digital camera.

In this embodiment, a pulse-amplitude and a pulse-cycle are used with reference to the rectangular wave signal, and an amplitude and a cycle are used with reference to the other signals (the first and second sine wave signals). Both the pulse-amplitude of the rectangular pulse wave, and the amplitude of the other waves, define the difference in the maximum and minimum values, in other words, the width of vibration.

The photographing apparatus 1 comprises an optical finder 11, an LED on button 12, an LED on switch 12a, a photometric switch 13a, a release button 14, a release switch 14a, a continuous shot button 15, a continuous shot switch 15a, a video button 16, a video switch 16a, an LCD monitor 17, an LED 31 for lighting, a current limiting resistor 32, a limiting resistor 33, a wave converter circuit 34, a signal switching unit 35, an illuminating circuit 36, and a transistor Tr2.

The photographing apparatus 1 comprises a CPU 21, an imaging block 22, an AE (automatic exposure) unit 23, and an AF (automatic focusing) unit 24. The imaging block 22 is composed of an imaging device such as a CCD etc. (which is not depicted). The AE unit 23 performs the photometric operation for the photographic subject, calculates the photometric values, and calculates the aperture value and the time length of the exposure time which is needed for the imaging, corresponding to the photometric values. The AF unit 24 performs the AF sensing operation, and performs the focusing operation which is needed for the imaging, corresponding to the result of the AF sensing operation.

The optical finder 11 is an apparatus which can be used to optically observe the photographic subject image. The photographic subject image can also be indicated on the LCD 17, as an image which is imaged by the imaging block 22.

When the LED on button 12 is pushed by the operator, the LED on switch 12a changes to the on state, so that the LED 31 is illuminated in the exposure time etc.

When the release button 14 is half pushed by the operator, the photometric switch 13a changes to the on state, so that the photometric operation, the AF sensing operation, and the focusing operation are performed.

When the release button 14 is fully pushed by the operator, the release switch 14a changes to the on state, so that the imaging operation is performed.

When the continuous shot button 15 is pushed by the operator, the continuous shot switch 15a changes to the on state, and a plurality of photographic subject images are continuously imaged, for example three frames per second, while the release switch 14a is in the on state. When the continuous shot switch 15a is in the on state, the photographing apparatus 1 is in a continuous shot mode.

When the video button 16 is pushed by the operator, the video switch 16a changes to the on state, so that the photographic subject image is imaged at a predetermined frame interval, and is stored as a moving picture, while the release switch 14a is in the on state. When the video switch 16a is in the on state, the photographing apparatus 1 is in a video mode.

The LED 31 is a lighting device which supplies a proper quantity of light to the photographic subject, to illuminate the photographic subject, during an exposure time, as an electric flash, and a post-exposure time for confirming the composition, in accordance with the exposure timing, when there is insufficient lighting of the photographic subject.

The LED 31 is driven in accordance with one of a rectangular wave signal and a first sine wave signal which is converted from the rectangular wave signal by the wave converter circuit 34 (which is described later).

The rectangular wave signal is the signal of which the on state and off state are continuously switched according to a certain on/off cycle (which is equal to the reciprocal of the value of the duty frequency f), and has a pulse-amplitude Vcc and a pulse-cycle C1. It is desirable that the value of the duty frequency f is larger than or equal to 50 Hz, in other words the value of the on/off cycle (the pulse-cycle C1) should be smaller than or equal to 1/50 of a second, so that flickering does not occur in the LED 31, because the cycle of the first sine wave signal which is converted from the rectangular wave signal is equal to the pulse-cycle.

The CPU 21 outputs the rectangular wave signal to the wave converter circuit 34 from the port 20. The wave converter circuit 34 converts the rectangular wave signal to the first sine wave signal.

In this embodiment, a duty ratio D is defined as the ratio of time in the on state (the pulse-width $\tau 1$), to the time of one pulse-cycle C1 of the rectangular wave signal.

The rectangular wave signal, having a pulse-amplitude of Vcc, a pulse-cycle of C1, and a duty ratio of D (0%<D<100%), is output from the CPU 21 during the exposure time in which an imaging operation is performed, when the LED 31 is used. Further, the rectangular wave signal is output with the duty ratio D between the exposure time termination and the next exposure time start, in other words the post-exposure time, or at any time other than that for the exposure operation, when the LED 31 is used.

When the LED 31 is not used, the rectangular wave signal is not output, or is output with 0% duty ratio in the exposure time and in the post-exposure time.

In this embodiment, the value of the duty frequency f is set in the CPU 21 in advance, however the value of the duty frequency f may be changed by the operator. The duty ratio D is set by using the PWM timer function of the CPU 21 in accordance with a proper quantity of light for illuminating the photographic subject.

Accordingly, the CPU 21 has a rectangular wave signal generating function.

The first sine wave signal is composed of a fist half sine wave and a second half wave which are connected.

The first half sine wave is a wave form corresponding to the on state of the rectangular wave (the section having the pulse-width $\tau 1$) and has the high-frequency component of the rectangular wave signal removed so that only the primary component remains.

The second half sine wave is a wave form corresponding to the off state of the rectangular wave (the section $\tau 2$ which is the difference between the pulse-cycle C1 and the pulse-width $\tau 1$). The high-frequency component is removed from the rectangular wave signal and only the primary component remains.

Accordingly, the first sine wave signal, comprising the first and second half sine waves, has an amplitude which is equal to the pulse-amplitude Vcc, and has a cycle which is equal to the pulse-cycle C1 ($=\tau 1+\tau 2$).

When the duty ratio D is 50%, the pulse-width $\tau 1$ and the section $\tau 2$, which is the difference between the pulse-cycle C1 and the pulse-width $\tau 1$, become the same, so that the first half sine wave and the second half sine wave are parts of the same sine wave. Or, the wave form of one cycle of the first sine wave signal has point symmetry, and has one sine wave form (see FIG. 7).

When the duty ratio D is not 50%, the pulse-width τ1 and the section τ2, which is the difference between the pulse-cycle C1 and the pulse-width τ1, are not the same, so that the first half sine wave and the second half sine wave are not parts of the same sine wave. Or, the wave form of one cycle of the first sine wave signal does not have point symmetry, and has a form where two sine waves are connected (see FIG. 8).

In this embodiment, the wave signal, where the first half sine wave and the second half sine wave are connected, is defined as the first sine wave signal. Similarly, the wave signal which has the opposite phase to that of the first sine wave signal and of which the first half sine wave and the second half sine wave are connected, is defined as a second sine wave signal, as described later.

One of the rectangular wave signal and the first sine wave signal which is converted from the rectangular wave signal, is supplied to the LED 31, through the current limiting resistor 32 etc., controlled by the signal switching unit 35 which is described later.

The radiation level of the LED 31 is synchronized with one of the rectangular wave signal and the first sine wave signal, during illumination. Specifically, the radiation level of the LED 31 has a rectangular wave form which has the same cycle as the pulse-cycle C1 of the rectangular wave signal, when the LED 31 is illuminated on the basis of the rectangular wave signal, in the exposure time. The radiation level of the LED 31 has a sine wave form which has the same cycle as the cycle C1 of the sine wave signal, when the LED 31 is illuminated on the basis of the sine wave signal, in the post-exposure time. So that when the radiation level of the LED 31 has a maximum value, one of the rectangular wave signal and the first sine wave signal has a maximum value. However, the radiation level of the LED 31 is based on characteristics of the LED 31 and the illuminating circuit 36, and a current amplification factor of the transistor Tr2.

In this embodiment, whenever the LED on switch 12a is switched to the on sate by the operator, the LED 31 is automatically illuminated in the exposure time etc., however the LED 31 may be automatically illuminated in the exposure time etc., according to the photometric value obtained from the photometric operation.

The various output commands corresponding to the input signals of these switches are controlled by the CPU 21.

The information whether the LED on switch 12a is in the on state or in the off state, is input to a port P12 of the CPU 21 as a 1-bit digital signal. The information whether the photometric switch 13a is in the on state or in the off state, is input to a port P13 of the CPU 21 as a 1-bit digital signal. The information whether the release switch 14a is in the on state or in the off state, is input to a port P14 of the CPU 21 as a 1-bit digital signal. The information whether the continuous shot switch 15a is in the on state or in the off state, is input to a port P15 of the CPU 21 as a 1-bit digital signal. The information whether the video switch 16a is in the on state or in the off state, is input to a port P16 of the CPU 21 as a 1-bit digital signal.

The imaging block 22 is connected to a port P3 of the CPU 21 for inputting and outputting signals. The AE unit 23 is connected to a port P4 of the CPU 21 for inputting and outputting signals. The AF unit 24 is connected to a port P5 of the CPU 21 for inputting and outputting signals.

The port P20 of the CPU 21 is connected with the wave converter circuit 34 and the signal switching unit 35. The wave converter circuit 34 converts the rectangular wave signal to the first sine wave signal. The signal switching unit 35 switches the signal which is supplied to the LED 31 for illuminating, to one of the rectangular wave signal and the first sine wave signal.

The port P21 of the CPU 21 is connected with the signal switching unit 35.

The rectangular wave signal is output from the port P20 of the CPU 21, so that the rectangular wave signal which is input to the wave converter circuit 34, is converted to the first sine wave signal. One of the rectangular wave signal and the first sine wave signal is supplied to the LED 31, according to the condition of the signal switching unit 35.

One of the Hi signal and the Lo signal is output from the port P21 of the CPU 21. When the Hi signal is output, the rectangular wave signal is supplied to the LED 31. When the Lo signal is output, the first sine wave signal is supplied to the LED 31.

The rectangular wave signal is input to the LED 31 passing through the first switch 35a of the signal switching unit 35, the illuminating circuit 36, and the limiting resistor 32. The first sine wave signal is input to the LED 31 passing through the second switch 35b of the signal switching unit 35, the current limiting resistor 33, the transistor Tr2, and the limiting resistor 32.

The wave converter circuit 34 is composed of an active filter circuit 341 and an inverting amplifier 342.

Figure 7:
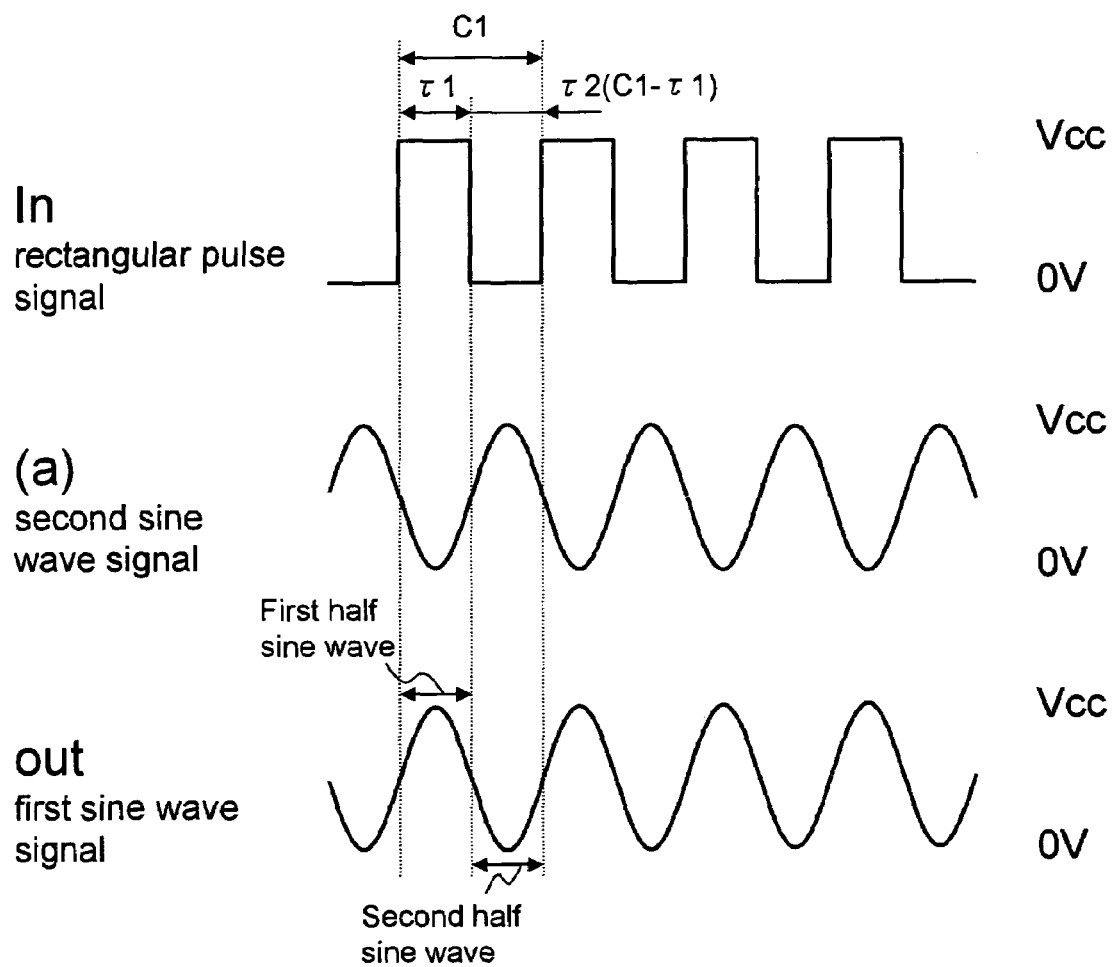
FIG. 7 shows the rectangular wave signal, the first sine wave signal, and the second sine wave signal, when the duty ratio of the rectangular wave signal is 50%.
Figure 8:
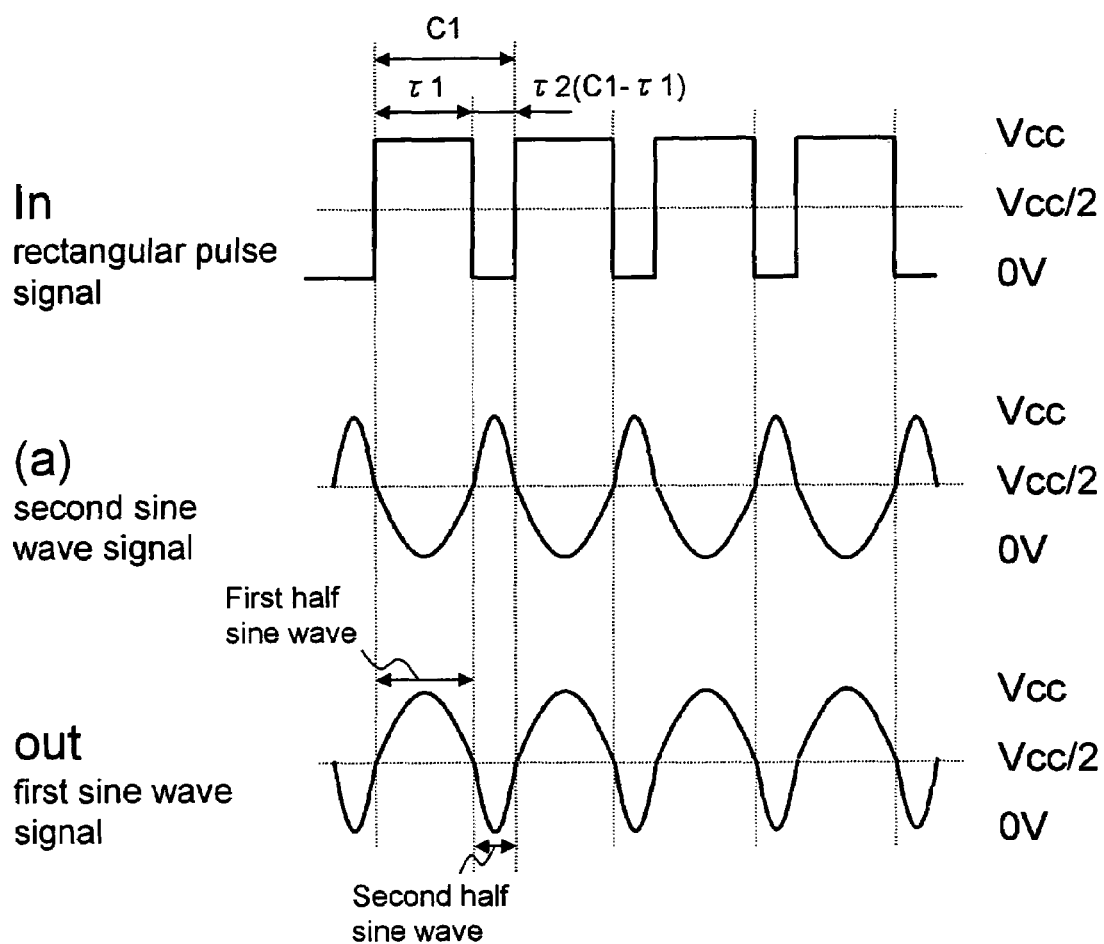
FIG. 8 shows the rectangular wave signal, the first sine wave signal, and the second sine wave signal, when the duty ratio of the rectangular wave signal is not 50%.

The active filter circuit 341 converts the rectangular wave signal, which has the pulse-amplitude Vcc and the pulse-cycle C1 (see the "in" wave form of FIGS. 7 and 8), to a second sine wave signal, which has the amplitude Vcc and the cycle C1 (see the "(a)" wave form of FIGS. 7 and 8). While the rectangular wave signal is in the on state, the second sine wave signal has the minimum value. While the rectangular wave signal is in the off state, the second sine wave signal has the maximum value.

The inverting amplifier 342 converts the second sine wave signal to the first sine wave signal (see the "out" wave form of FIGS. 7 and 8). The amplitude and the cycle of the first sine wave signal are the same as those of the second sine wave signal, however the first sine wave signal and the second sine wave signal have the opposite phase.

The active filter circuit 341 has a resistor R1, a resistor R2, a resistor R11 which has two times the resistance of the resistor R1, a capacitor C11, a capacitor C12, and a first operational amplifier 3410. The first operational amplifier 3410 has an inverting input terminal, a non-inverting input terminal, and an output terminal. The first operational amplifier 3410 is supplied with power having voltage Vcc.

The inverting input terminal of the first operational amplifier 3410 has the rectangular wave signal input thereto. The rectangular wave signal is the input signal passing through the resistor R1 and the capacitor C11, from the port 20 of the CPU 21. The non-inverting input terminal of the first operational amplifier 3410 is connected with the power supply whose voltage is ½ Vcc, and is connected with the non-inverting input terminal of the second operational amplifier 3420 in the inverting amplifier 342 which is described later. The second sine wave signal is output from the output terminal of the first operational amplifier 3410. The output terminal of the first operational amplifier 3410 is connected with the inverting input terminal of the first operational amplifier 3410 through the resistor R11, and is connected with a point between the resistor R1 and the capacitor C11, through the capacitor C12. One terminal of the resistor R2 is connected with the non-inverting input terminal of the first operational amplifier 3410 and the power supply whose voltage is ½ Vcc, so that the other terminal of the resistor R2 is connected with a point between the resistor R1 and the capacitor C11. The output terminal of the first operational amplifier 3410 is connected with the inverting input terminal of the second operational amplifier 3420, through the resistor R21 in the inverting amplifier 342 which is described later.

The inverting amplifier 342 has a resistor R21, a resistor R22, and a second operational amplifier 3420. The second operational amplifier 3420 has an inverting input terminal, a non-inverting input terminal, and an output terminal. The second operational amplifier 3420 is supplied with power having a voltage Vcc.

The inverting input terminal of the second operational amplifier 3420 has the second sine wave signal input thereto. The second sine wave signal is input through the resistor R21, from the output terminal of the first operational amplifier 3410. The non-inverting input terminal of the second operational amplifier 3420 is connected with the non-inverting input terminal of the first operational amplifier 3410 in the active filter circuit 341. The first sine wave signal is output from the output terminal of the second operational amplifier 3420. The output terminal of the second operational amplifier 3420 is connected with the inverting input terminal of the second operational amplifier 3420 through the resistor R22.

The signal switching unit 35 is composed of a first switch 35a, a second switch 35b, and an inverter 35c. The first switch 35a and the second switch 35b are the switches that switch to the on state corresponding to the Hi signal input, and that switch to the off state corresponding to the Lo signal input from port P21 of the CPU 21. The inverter 35c is an inverting circuit that outputs the Lo signal when the Hi signal is input to the inverter 35c, and that outputs the Hi signal when the Lo signal is input to the inverter 35c from port P21 of the CPU 21.

Accordingly, when the Hi signal is output from the port P21 of the CPU 21, the first switch 35a changes to the on state because the Hi signal is input to the first switch 35a. Therefore, the rectangular wave signal is output to the LED 31 through the illuminating circuit 36, and the limiting resistor 32.

When the Lo signal is output from the port P21 of the CPU 21, the second switch 35b changes to the on state because the Hi signal is input to the second switch 35b from the inverter 35c. Therefore, the first sine wave signal is output to the LED 31 through the current limiting resistor 33, transistor Tr2, and the limiting resistor 32.

The illuminating circuit 36 is composed of a transistor Tr1, a first bias resistor 36a, and a second bias resistor 36b. The transistor Tr1 is an NPN transistor which performs the switching of the rectangular wave signal which is supplied to the LED 31 in order to drive the LED 31, and whose base is connected to the CPU 21 through the first bias resistor 36a and the signal switching unit 35. The emitter of the transistor Tr1 is grounded, the collector of the transistor Tr1 is connected with the cathode of the LED 31 through the limiting resistor 32. The anode of the LED 31 is connected with the power supply whose voltage is Vcc. The second bias resistor 36b is connected between the base of the transistor Tr1 and the emitter of the transistor Tr1.

The transistor Tr2 is an NPN transistor for amplifying the first sine wave signal which is supplied to the LED 31, and whose base is connected to the CPU 21 through the current limiting resistor 33, the signal switching unit 35, and the wave converter circuit 34. The emitter of the transistor Tr2 is grounded, the collector of the transistor Tr2 is connected with the cathode of the LED 31 through the limiting resistor 32.

Accordingly, the CPU 21, the limiting resistor 32, the current limiting resistor 33, the wave converter circuit 34, the signal switching unit 35, the illuminating circuit 36, and the transistor Tr2 have a signal supplying function which supplies one of the rectangular wave signal and the sine wave signal to the LED 31.

While the rectangular wave signal which is output from the CPU 21 is in the on state, the first sine wave signal has the maximum value. While the rectangular wave signal is in the off state, the first sine wave signal has the minimum value. Accordingly, the timing while the rectangular wave signal is in the on state and the timing when the first sine wave signal has the maximum value agree. Specifically, the first sine wave signal has the maximum value at a point that corresponds to the intermediate point of the section of the rectangular wave signal that is in the on state, so that the first sine wave signal has the minimum value at a point that corresponds to the intermediate point of the section of the rectangular wave signal that is in the off state.

When the release button 14 is half pushed, the photometric switch 13a is set to the on state, so that the port P13 receives the on state signal. The CPU 21 drives an AE sensor (which is not depicted) of the AE unit 23, so that the AE unit 23 performs the photometric operation, calculates the photometric value, and then calculates the aperture value and the exposure time, which are needed for imaging, corresponding to the photometric values. The CPU 21 drives a sensor (which is not depicted) of the AF unit 24, so that the AF unit 24 performs the AF sensing operation. Further a lens control circuit of the AF unit 24 (which is not depicted) is driven, and the focusing operation which is needed for imaging, is performed by moving the lens position in the light axis direction, corresponding to the result of the AF sensing operation.

When the release button 14 is fully pushed, the release switch 14a is set to the on state, so that the port 14 receives the on state signal. The CPU 21 performs the imaging operation, or the CPU 21 drives an aperture mechanism (which is not depicted) corresponding to the aperture value, drives a release of the shutter mechanism (which is not depicted) with a predetermined shutter speed, and then drives the imaging block 22 for the exposure.

When the LED on switch 12a and the release switch 14a are set to the on state, on state signals are input to the ports P12 and P14 (so that the CPU 21 outputs the rectangular wave signal from the port P20, and the Hi signal from the port P21, in accordance with the exposure timing of the imaging block 22), the rectangular wave signal is supplied to the LED 31 through the limiting resistor 32 etc., and the LED 31 illuminates on the basis of the rectangular wave signal.

When the release switch 14a and the continuous shot switch 15a are set to the on state, on state signals are input to the ports P14 and P15. The imaging operation, controlled by the CPU 21, is continuously performed at a certain interval, while the release switch 14a is in the on state. In other words, the release of the shutter mechanism is driven, the imaging block 22 is driven, and the exposure operation is performed. The certain interval are set in the photographing apparatus 1 by the operator, in order to take continuous still images, for example ⅓ second. Accordingly, the CPU 21 has a continuous shot control function which continuously performs a plurality of exposure operations of the photographic subject.

When the release switch 14a and the video switch 16a are set to the on state, on state signals are input to the ports P14 and P16. The imaging operation, controlled by the CPU 21, is continuously performed at predetermined intervals, while the release switch 14a is in the on state. In other words, the release of the shutter mechanism is driven, the imaging block 22 is driven, and the exposure operation is performed. The predetermined intervals are set in the photographing apparatus 1 in advance, in order to take a video image, for example 1/60 second (which is equal to one frame period).

When the LED on switch 12a, the release switch 14a, and the continuous shot switch 15a are set to the on state, the rectangular wave signal is output from the port 20 of the CPU 21, and one of the Hi signal and Lo signal is output from the port P21 of the CPU 21, during the exposure time and the post-exposure time. During the exposure time, the Hi signal is output from the port P21 of the CPU 21, so that during the post-exposure time, the Lo signal is output from the port P21 of the CPU 21.

During the exposure time where the Hi signal is output, the first switch 35a is in the on state and the second switch 35b is in the off state, so that the rectangular wave signal is supplied to the LED 31 through the first switch 35a and the illuminating circuit 36.

During the post-exposure time where the Lo signal is output, the first switch 35a is in the off state and the second switch 35b is in the on state, so that the first sine wave signal is supplied to the LED 31 through the second switch 35b and the transistor Tr2.

The first sine wave signal is the rectangular wave signal which has the high-frequency component removed and for which only the primary component remains. Accordingly, when the LED 31 is illuminated on the basis of the first sine wave signal, it is possible to reduce the influence of noise in the power line, and noise to be transmitted to the peripheral circuit, that is caused by the high-frequency component which is included in the rectangular wave signal, in comparison with when the LED 31 is illuminated on the basis of the rectangular wave signal.

When the rectangular wave signal is used for driving the LED for lighting, it is easily possible to obtain the light quantity which is needed to supply to the photographic subject, by changing the duty ratio D.

However, when the sine wave signal is used for driving the LED for lighting, it is not easily possible to obtain the light quantity which is needed to supply to the photographic subject.

Figure 9:
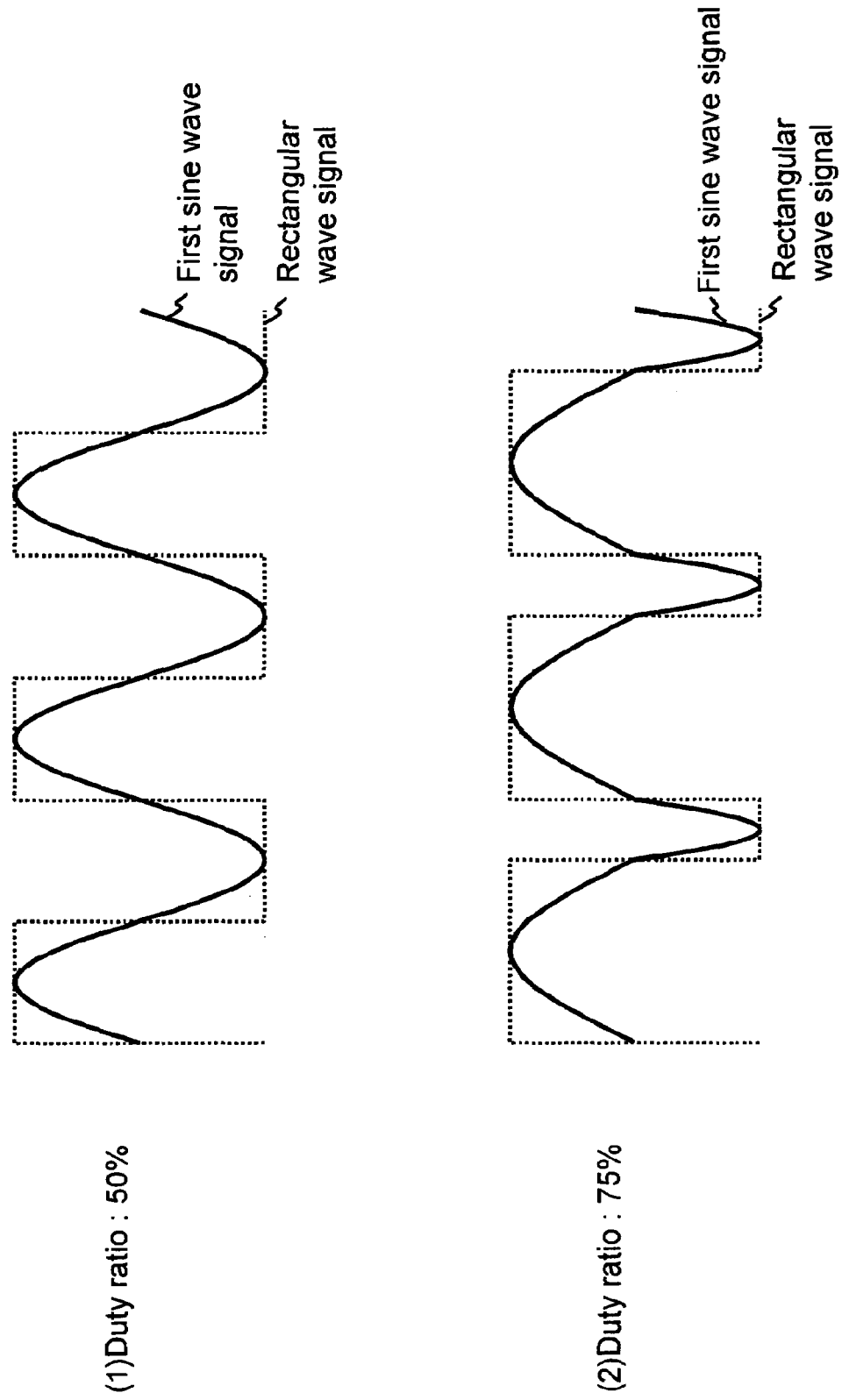
FIG. 9 shows the relationship between the rectangular wave signal and the first sine wave signal, in detail.

Or, when the duty ratio D is 50%, the light quantity obtained by using the rectangular wave signal is the same as the light quantity obtained by using the first sine wave signal, from the viewpoint of energy (see FIG. 9 (1)). However, when the duty ratioD is not 50% (for example D: 75%), the light quantity obtained by using the rectangular wave signal is not the same as the light quantity obtained by using the first sine wave signal, from the viewpoint of energy (see FIG. 9 (2)).

Accordingly, the light quantity obtained by using the first sine wave signal, which is converted from the rectangular wave signal, is not in proportion to the duty ratio D of the rectangular wave signal.

So, driving the LED 31 by using the first sine wave signal is suitable from the viewpoint of removing noise in comparison with driving the LED 31 by using the rectangular wave signal, because the first sine wave signal has the high-frequency component removed. However, driving the LED 31 by using the first sine wave signal is not suitable from the viewpoint of obtaining the predetermined light quantity in comparison with driving the LED 31 by using the rectangular wave signal, when the photographing apparatus 1 illuminates the photographic subject as an electric flash in the exposure time. On the other hand, it is not necessary to strictly obtain the light quantity for illuminating the photographic subject, in the post-exposure time, because the photographing apparatus 1 illuminates the photographic subject for confirming the composition (not as an electric flash).

Accordingly, driving the LED 31 by using the rectangular wave signal is suitable from the viewpoint of obtaining a predetermined light quantity in the exposure time. The driving of the LED 31 by using the first sine wave signal is suitable from the viewpoint of removing noise.

When the LED on switch 12a, the release switch 14a, and the video switch 16a are set to the on state, the rectangular wave signal is output from the port P20 of the CPU 21, during the exposure time and the post-exposure time, so that one of the Hi signal and the Lo signal is output from the port P21 of the CPU 21, similar to when the LED on switch 12a, the release switch 14a, and the continuous shot switch 15a are set to the on state.

Figure 10:
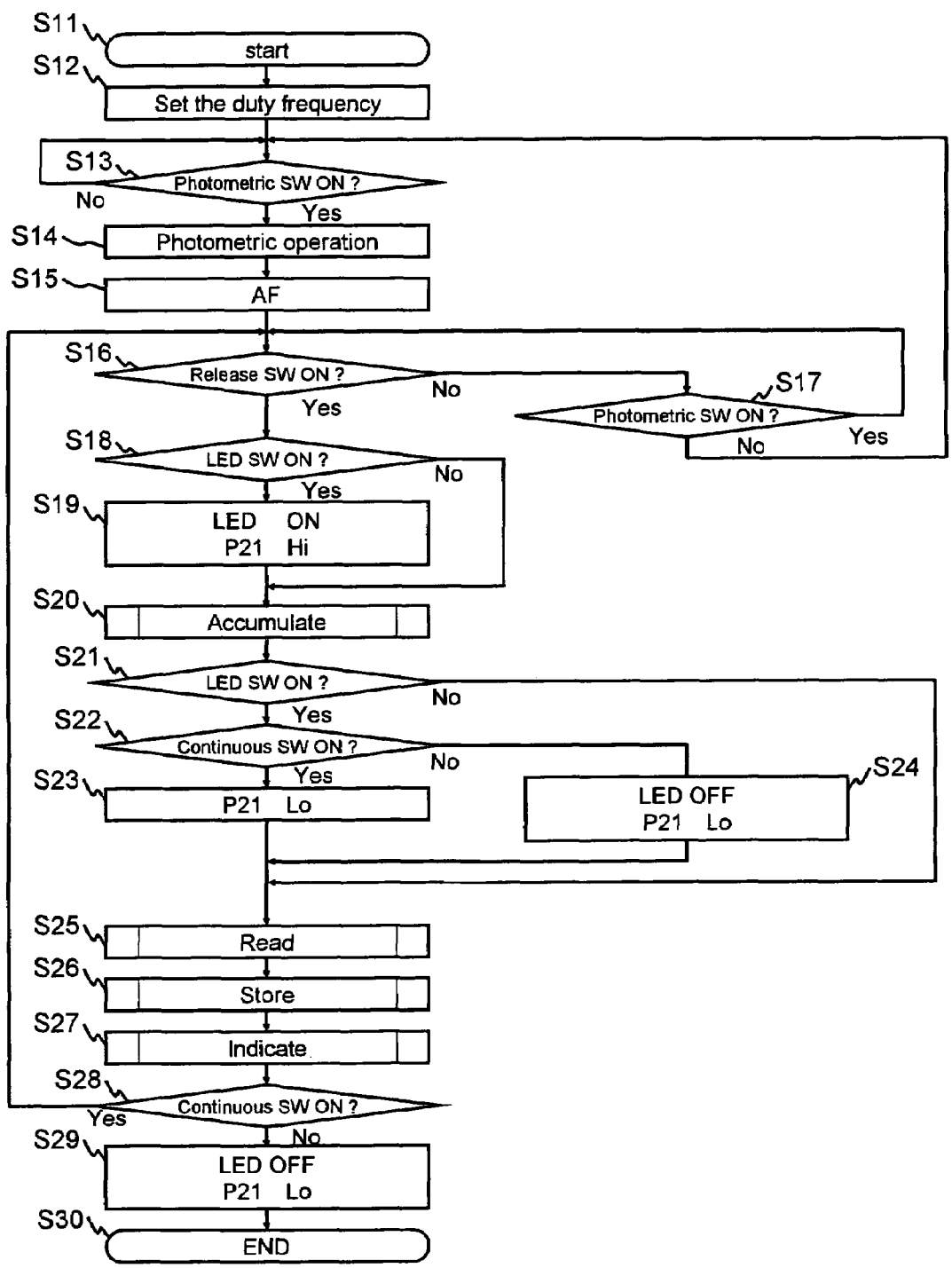
FIG. 10 is a flowchart of the LED illumination process in the exposure time, in the continuous shot mode.
Figure 11:
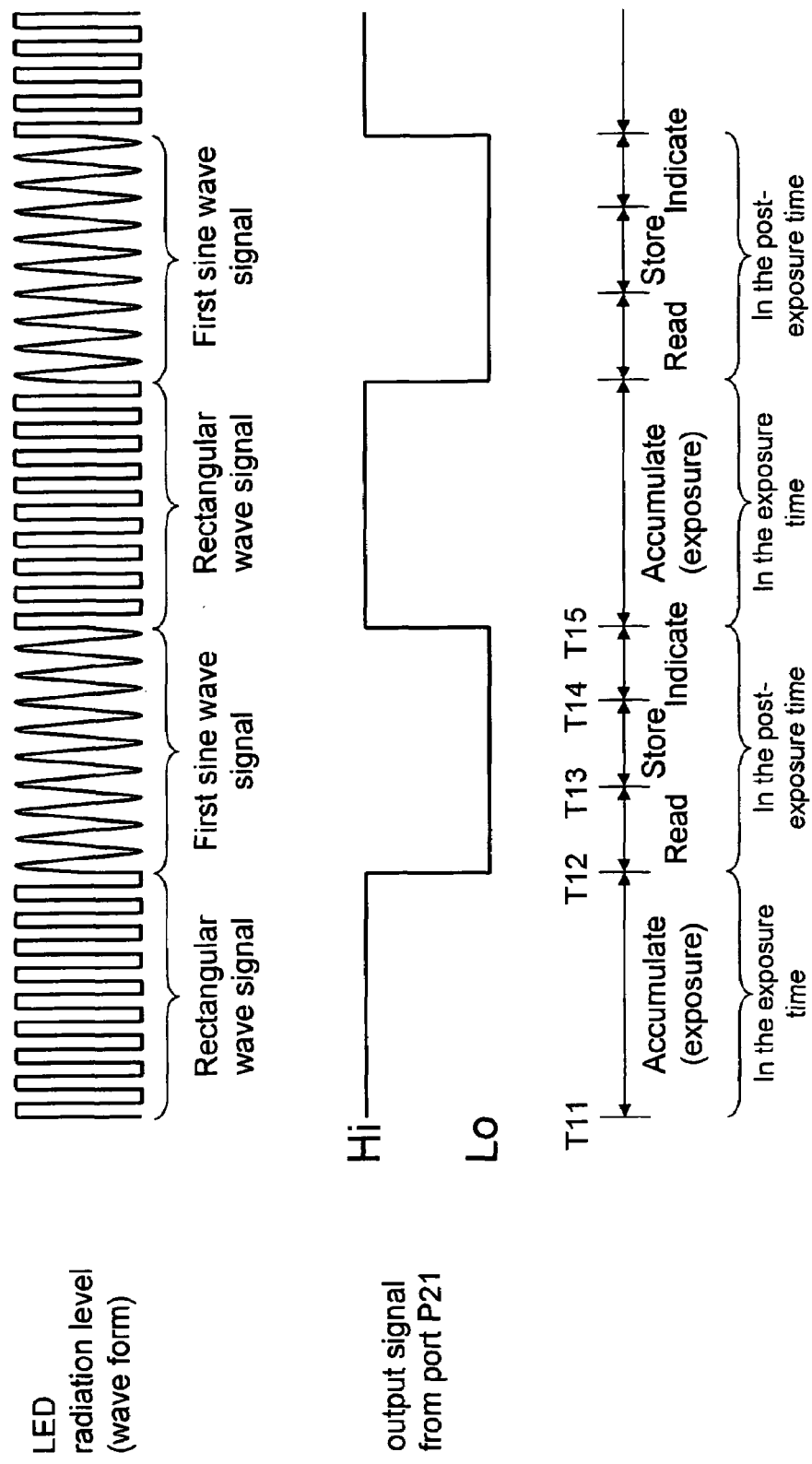
FIG. 11 is a timing chart which shows the relationship between the LED radiation level and the output signal from port P21 in the exposure time and in the post-exposure time.

Next, the control of the LED 31 in the exposure time and the post-exposure time, in the continuous shot mode (where the continuous shot switch 15a is in the on state) is explained by the flowchart in FIG. 10 and the timing chart in FIG. 11.

In step S11, the power supply of the photographing apparatus 1 is set to the on state. In step S12, the duty frequency f is set in the CPU 21. However, the value of the duty frequency f may be set in the CPU 21 in advance. In this time, the signal which is output from the port P21 of the CPU 21, is the Lo signal.

In step S13, it is judged whether the photometric switch 13a is set to the on state. When it is judged that the photometric switch 13a is not set to the on state, the process in step S13 is repeatedly carried out. When it is judged that the photometric switch 13a is set to the on state, the AE sensor of the AE unit 23 is driven, the photometric operation is performed, and the aperture value and the exposure time are calculated in step S14. In step S15, the AF sensor of the AF unit 24 is driven, the AF sensing is performed, and the focusing operation is performed, by driving the lens control circuit of the AF unit 24. In this initial condition, which is indicated in steps S11~S15, the signal which is output from the port P21 of the CPU 21, is the Lo signal.

In step S16, it is judged whether the release switch 14a is set to the on state. When it is judged that the release switch 14a is not in the on state, it is judged whether the photometric switch 13a is set to the on state, in step S17. When it is judged that the photometric switch 13a is set to the on state in step S17, the flow is returned to step S16. When it is judged that the photometric switch 13a is not set to the on state in step S17, the flow is returned to step S13. When it is judged that the release switch 14a is set to the on state in step S16, it is judged whether the LED on switch 12a is set to the on state, in step S18.

When it is judged that the LED on switch 12a is in the on state, the rectangular wave signal with the duty ratio D (0%<D<100%) which is set in advance, is output from the port P20 of the CPU 21, and the signal which is output from the port P21 of the CPU 21, is set to the Hi signal, in step S19. The rectangular wave signal is supplied to the LED 31 through the limiting resistor 32 etc. The exposure operation, in other words electric charge accumulation of the CCD, is performed under the condition where the LED 31 is illuminated, and where the illumination is driven by the rectangular wave signal, in step S20 (see point T11 in FIG. 11).

When it is judged that the LED on switch 12a is not in the on state in step S18, the LED 31 is not driven, so that the exposure operation, in other words electric charge accumulation of the CCD, is performed under the condition where the LED 31 is not illuminated, in step S20.

After the exposure time has passed, it is judged whether the LED on switch 12a is in the on state, in step S21. When it is judged that the LED on switch 12*a* is in the on state, it is judged whether the continuous shot switch 15*a* is in the on state, in step S22.

When it is judged that the continuous shot switch 15*a* is in the on state, the signal which is output from the port P21 of the CPU 21, is set to the Lo signal, in step S23, so that the first sine wave signal which is converted from the rectangular wave signal is supplied to the LED 31 through the limiting resistor 32 etc., and the LED 31 is illuminated, driven by the first sine wave signal in the post-exposure time (see the period between point T12 and point T15 in FIG. 11).

When it is judged that the continuous shot switch 15*a* is not in the on state, the LED 31 is turned off, in other words, the duty ratio D with which the rectangular wave signal is output from the port P20 of the CPU 21, becomes 0%, so that the signal which is output from the port P21 of the CPU 21, is set to the Lo signal, in step S24. Accordingly, the LED 31 is not illuminated in the post-exposure time.

When it is judged that the LED on switch 12*a* is not in the on state in step S21, the flow is forwarded to step S25. Accordingly, at this time, the LED 31 is not illuminated in the exposure time and in the post-exposure time.

In step S25, the electric charge which is accumulated in the CCD in the exposure time is read (see point T12 in FIG. 11), so that, in step S26, the electric charge which is read, is stored in the memory of the photographing apparatus 1, as the image signal which was imaged by the imaging block 22 (see point T13 in FIG. 11). In step S27, the image signal which is stored, is indicated on the LCD monitor 17 (see point T14 in FIG. 11).

In step S28, it is judged whether the continuous shot switch 15*a* is in the on state. When it is judged that the continuous shot switch 15*a* is in the on state, the flow is returned to the step S16, so that the next exposure operation is performed (see point T15 in FIG. 11). When it is judged that the continuous shot switch 15*a* is not in the on state, in step S28, the LED 31 is turned off, in step S29. Or, the duty ratio D with which the rectangular wave signal is output from the port P20 of the CPU 21, becomes 0%, so that the signal which is output from the port P21 of the CPU 21, is set to the Lo signal. In step S30, the control of the LED 31 in the exposure time, in the continuous shot mode (where the continuous shot switch 15*a* is in the on state), is finished.

Figure 12:
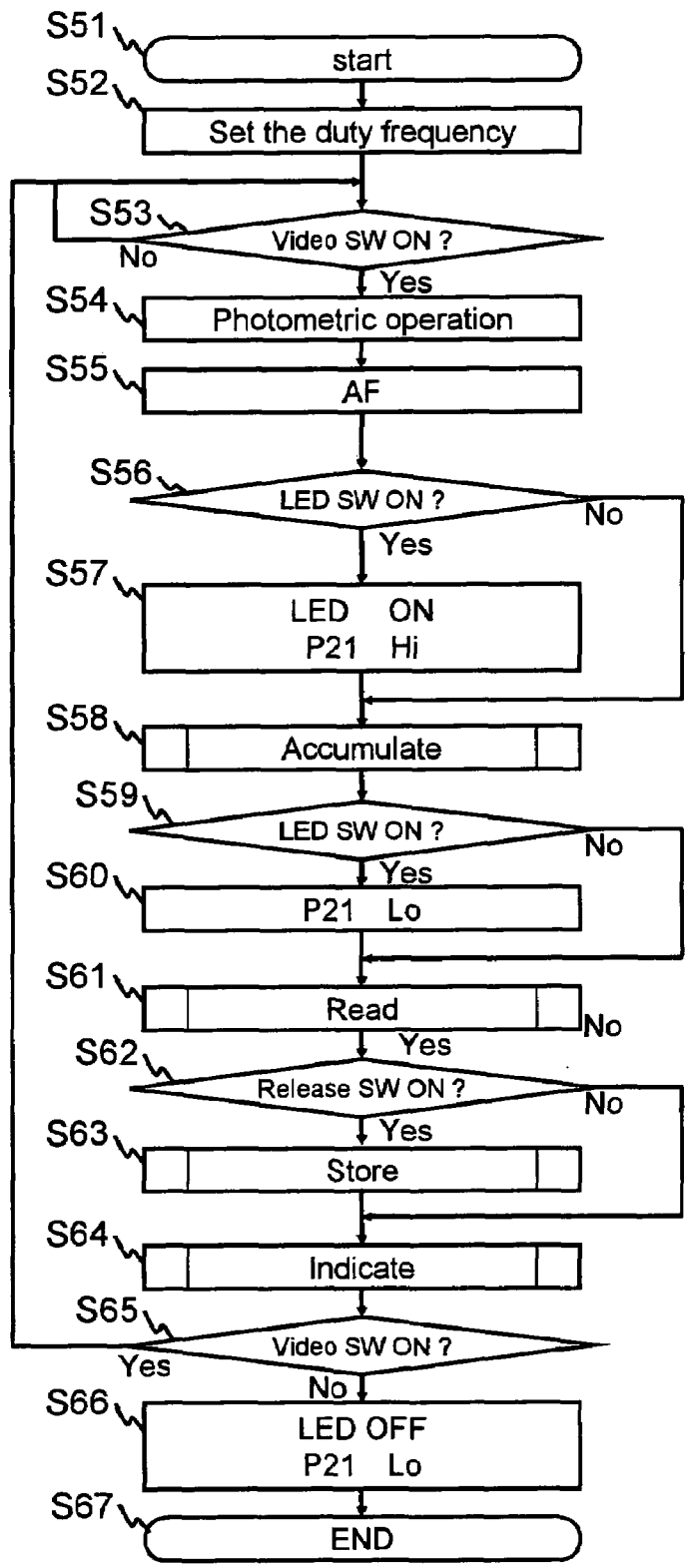
FIG. 12 is a flowchart of the LED illumination process in the exposure time, in the video mode.

Next, the control of the LED 31 in the exposure time and the post-exposure time, in the video mode (where the video switch 16*a* is in the on state), is explained by the flowchart in FIG. 12 and the timing chart in FIG. 11. The timing chart in FIG. 11 is useful for both the continuous shot mode and the video mode.

In step S51, the power supply of the photographing apparatus 1 is set to the on state. In step S52, the duty frequency f is set in the CPU 21. However, the value of the duty frequency f may be set in the CPU 21 in advance. In this time, the signal which is output from the port P21 of the CPU 21, is the Lo signal.

In step S53, it is judged whether the video switch 16*a* is set to the on state. When it is judged that the video switch 16*a* is not set to the on state, the process in step S53 is repeatedly carried out. When it is judged that the video switch 16*a* is set to the on state, the AE sensor of the AE unit 23 is driven, the photometric operation is performed, and the aperture value and the exposure time are calculated in step S54. In step S55, the AF sensor of the AF unit 24 is driven, the AF sensing is performed, and the focusing operation is performed, by driving the lens control circuit of the AF unit 24. In this initial condition, which is indicated in steps S51~S55, the signal which is output from the port P21 of the CPU 21, is the Lo signal.

In step S56, it is judged whether the LED on switch 12*a* is set to the on state. When it is judged that the LED on switch 12*a* is not in the on state, the exposure operation, in other words electric charge accumulation of the CCD, is performed under the condition where the LED 31 is not illuminated, in step S58.

When it is judged that the LED on switch 12*a* is in the on state, the rectangular wave signal with the duty ratio D (0%<D<100%) which is set in advance, is output from the port P20 of the CPU 21, and the signal which is output from the port P21 of the CPU 21, is set to the Hi signal, in step S57. The rectangular wave signal is supplied to the LED 31 through the limiting resistor 32 etc. The exposure operation, in other words electric charge accumulation of the CCD, is performed under the condition where the LED 31 is illuminated, and where the illumination is driven by the rectangular wave signal, in step S58 (see point T11 in FIG. 11).

After the exposure time has passed, it is judged whether the LED on switch 12*a* is in the on state, in step S59. When it is judged that the LED on switch 12*a* is in the on state, the signal which is output from the port P21 of the CPU 21, is set to the Lo signal, in step S60, so that the first sine wave signal which is converted from the rectangular wave signal, is supplied to the LED 31 through the limiting resistor 32 etc., and the LED 31 is illuminated, driven by the first sine wave signal in the post-exposure time (see the period between point T12 and point T15 in FIG. 11).

When it is judged that the LED on switch 12*a* is not in the on state in step S59, the flow is forwarded to step S61 without through step S60. Accordingly, the LED 31 is not illuminated in the post-exposure time.

In step S61, the electric charge which is accumulated in the CCD in the exposure time is read (see point T12 in FIG. 11). In step S62, it is judged whether the release switch 14*a* is in the on state.

When it is judged that the release switch 14*a* is in the on state in step S62, the electric charge which is read is stored in the memory of the photographing apparatus 1, as the image signal which was imaged by the imaging block 22, in step S63 (see point T13 in FIG. 11). In step S64, the image signal is indicated on the LCD monitor 17 (see point T14 in FIG. 11).

When it is judged that the release switch 14*a* is not in the on state in step S62, the electric charge which is read is not stored in the memory of the photographing apparatus 1. In step S64, the image signal which was imaged by the imaging block 22 is indicated on the LCD monitor 17 (see point T14 in FIG. 11).

In step S65, it is judged whether the video switch 16*a* is in the on state. When it is judged that the video switch 16*a* is in the on state, the flow is returned to the step S53, so that the next exposure operation is performed (see point T15 in FIG. 11). When it is judged that the video switch 16*a* is not in the on state, the LED 31 is turned off, in step S66. Or, the duty ratio D with which the rectangular wave signal is output from the port P20 of the CPU 21, becomes 0%, so that the signal which is output from the port P21 of the CPU 21, is set to the Lo signal. In step S67, the control of the LED 31 in the exposure time, in the video mode (where the video switch 16*a* is in the on state), is finished.

The pulse-amplitude of the rectangular wave signal, and the amplitude of the first sine wave signal do not have to be the same as each other, so that the pulse-cycle of the rectangular wave signal, and the cycle of the first sine wave signal do not have to be the same as each other. However, the light quantity by the rectangular wave signal in the exposure time does not differ largely from the light quantity by the first sine wave signal in the post-exposure time.

In this embodiment, it was explained that the lighting device depends on radiation from an LED, however the lighting device may depend on other radiation devices which are driven by the rectangular wave signal etc., and which illuminate a photographic subject. And further, whose temperature goes up due to continuation use, and whose light quantity falls due to the temperature rise.

In this embodiment, it was explained that the photographing apparatus 1 is a digital camera, however the photographing apparatus 1 may be a film camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-424378 (filed on Dec. 22, 2003), which is expressly incorporated herein by reference, in its entirety.

The invention claimed is:

1. A lighting control apparatus of a photographing apparatus, comprising:
 a lighting device that illuminates a photographic subject by receiving one of a rectangular wave signal and a sine wave signal;
 a continuous imaging control processor that performs a continuous imaging operation where a plurality of images of said photographic subject are continuously imaged; and
 a signal supplying processor that supplies said rectangular wave signal to said lighting device in the exposure time, and that supplies said sine wave signal to said lighting device in the post-exposure time which is the time between said exposure time termination and the next exposure time start.

2. The lighting control apparatus according to claim 1, wherein said sine wave signal is composed of a first half sine wave and a second half sine wave, which are connected;
 said first half sine wave is a wave form corresponding to the on state of said rectangular wave signal and has the high-frequency component removed, so that only the primary component remains; and
 said second half sine wave is a wave from corresponding to the off state of said rectangular wave signal and has the high-frequency component removed, so that only the primary component remains.

3. The lighting control apparatus according to claim 2, wherein said signal supplying processor has a rectangular wave signal outputting processor, a wave converting processor, and a signal switching unit;
 said rectangular wave signal outputting processor outputs said rectangular wave signal having a predetermined pulse-amplitude, a predetermined pulse-width, and a predetermined pulse-cycle;
 said wave converting processor converts said rectangular wave signal to said sine wave signal;
 said signal switching unit supplies one of said rectangular wave signal and said sine wave signal, to be received by said lighting device, to said lighting device;
 said sine wave signal has an amplitude which is equal to said pulse-amplitude, and a cycle which is equal to said pulse cycle;
 a length of said on state of said rectangular wave signal is equal to said pulse-width; and
 a length of said off state of said rectangular wave signal is equal to the difference of said pulse-cycle and said pulse-width.

4. The lighting control apparatus according to claim 3, wherein said wave converting processor has an active filter circuit and an inverting amplifier which converts said rectangular wave signal to said sine wave signal, and during the period said rectangular wave signal is in the on state, said sine wave signal reaches the maximum value, so that during the period said rectangular wave signal is in the off state, said sine wave signal reaches the minimum value.

5. The lighting control apparatus according to claim 4, wherein said active filter circuit has a first operational amplifier, and said inverting amplifier has a second operational amplifier;
 an output terminal of said first operational amplifier is connected with an inverting input terminal of said second operational amplifier; and
 a non-inverting input terminal of said first operational amplifier is connected with a non-inverting input terminal of said second operational amplifier.

6. The lighting control apparatus according to claim 3, wherein said pulse-cycle is a value where flickering does not occur in said lighting device.

7. The lighting control apparatus according to claim 3, wherein said pulse-cycle is a value which is equal to or less than 1/50 second.

8. The lighting control apparatus according to claim 3, wherein said signal switching unit has an amplifying unit and a switching unit;
 said amplifying unit amplifies said sine wave signal and has a transistor for amplifying; and
 said switching unit has a transistor which performs the switching of said rectangular wave signal in order to drive said lighting device.

9. The lighting control apparatus according to claim 1, wherein said lighting device is an LED.

10. The lighting control apparatus according to claim 1, wherein the radiation level of said lighting device is synchronized with one of said rectangular wave signal and said sine wave signal, to be received by said lighting device, during illumination.

11. The lighting control apparatus according to claim 1, wherein said lighting device is used as an electric flash in said exposure time.

12. The lighting control apparatus according to claim 1, wherein said lighting device is used for confirming composition in said post-exposure time.

* * * * *